United States Patent
Li

(10) Patent No.: US 12,413,384 B2
(45) Date of Patent: Sep. 9, 2025

(54) RADIO RECEIVER DEVICES

(71) Applicant: Nordic Semiconductor ASA, Trondheim (NO)

(72) Inventor: Wei Li, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 59 days.

(21) Appl. No.: 18/514,009

(22) Filed: Nov. 20, 2023

(65) Prior Publication Data
US 2024/0171370 A1    May 23, 2024

(30) Foreign Application Priority Data
Nov. 22, 2022 (GB) ...................................... 2217464

(51) Int. Cl.
*H04L 7/04* (2006.01)
(52) U.S. Cl.
CPC .................................. *H04L 7/042* (2013.01)
(58) Field of Classification Search
CPC ............ H04L 7/042; H04L 2027/0024; H04L 2027/0026
See application file for complete search history.

(56) References Cited

U.S. PATENT DOCUMENTS

| | | | |
|---|---|---|---|
| 11,133,890 B2 * | 9/2021 | Fort | ...................... H04L 1/0031 |
| 2017/0272279 A1 * | 9/2017 | Zhao | ................... H04L 27/2666 |
| 2017/0288932 A1 * | 10/2017 | Kang | ................... H04L 27/2698 |
| 2020/0287658 A1 | 9/2020 | Fort | |

FOREIGN PATENT DOCUMENTS

| | | |
|---|---|---|
| EP | 1 611 722 A1 | 4/2017 |
| EP | 1 282 258 A1 | 2/2023 |
| WO | WO 2004/086710 A1 | 10/2004 |

OTHER PUBLICATIONS

IPO Combined Search and Examination Report under Sections 17 and 18(3) for Great Britain Application No. 2217464.3, dated May 12, 2023, 10 pages.

* cited by examiner

Primary Examiner — Freshteh N Aghdam
(74) Attorney, Agent, or Firm — Klarquist Sparkman, LLP

(57) ABSTRACT

A radio receiver device is provided. The radio receiver device is arranged to receive a radio signal comprising a symbol sequence corresponding to a training sequence; to determine a first autocorrelation of said symbol sequence using a first autocorrelation latency; to determine a second autocorrelation of said symbol sequence using a second autocorrelation latency that is longer than the first autocorrelation latency; and to combine said first and second autocorrelations to determine an estimate of carrier frequency offset between the radio signal and the radio receiver device.

20 Claims, 2 Drawing Sheets

RADIO RECEIVER DEVICES

CROSS REFERENCE TO RELATED APPLICATIONS

This application claims priority from Great Britain Application No. 2217464.3, filed Nov. 22, 2022, which application is incorporated herein by reference in its entirety.

BACKGROUND OF THE INVENTION

The present invention relates to carrier frequency offset (CFO) and radio receiver devices arranged to estimate CFO.

Radio communication involving the transmission and reception of modulated radio-frequency waves is commonplace. A transmitter may transmit symbols of data by modulating a radio signal with a carrier frequency. For the data to be successfully received by the intended receiver, the receiver must know accurately the timing and carrier frequency of the transmitted symbols. In other words, the receiver must be synchronised with the incoming series of symbols. Frequency synchronisation typically involves estimating and correcting for a carrier frequency offset (CFO), which is the offset between the carrier frequency of the incoming radio signal and a locally-generated oscillating signal used to demodulate and decode the incoming signal.

The lth symbol $y_l$ of an incoming signal can be modelled as:

$$y_l = e^{i2\pi fTl} x_l + n_l, \quad (1)$$

where $x_l$ is the lth transmitted symbol, T is the duration of a symbol, $n_l$ is noise on the symbol, and f is the carrier frequency offset between the transmitter and the receiver. It can be seen that when f is very small, the received symbol effectively equals the transmitted symbol plus noise.

Current approaches to estimating CFO include the calculation of an auto-correlation z of an incoming symbol sequence, where the incoming symbol sequence contains a known pattern of symbols (known as a Training Sequence or TS):

$$z_{l,D} = \quad (2)$$
$$y_l y_{l-D}^* = \left(e^{i2\pi fTl} x_l + n_l\right)\left(e^{i2\pi fT(l-D)} x_{l-D} + n_{l-D}\right)^* = x_l x_{l-D}^* e^{i2\pi fTD} + w_{l,D}.$$

Here, D is the auto-correlation lag, with 0<D<N, where N is the number of symbols in the incoming signal, and $w_{l,D}$ is the equivalent noise, i.e. $n_l e^{-i2\pi fT(l-D)} x^*_{l-D} + n^*_{l-D} e^{i2\pi fTl} x_l + n_l n^*_{l-D}$.

For given values of N and D, there are N–D results $z_{l,D}$. Averaging over these results gives:

$$S_{N,D} = \sum_{l=D}^{N} \frac{z_{l,D}}{x_{l-D} x_l^*} = (N-D) e^{i2\pi fTD} + \sum_{l=D}^{N} \frac{w_{l,D}}{x_{l-D} x_l^*}. \quad (3)$$

In some systems, the Training Sequence (TS) comprises a repeating Short Training Sequence (STS), i.e. $x_l = x_{l-P}$, where P is the length of the STS. In such systems D may be selected to be equal to P or a multiple of P, so that $x_{l-D} x^*_l = |x_l|^2$. Equation (3) can thus be simplified to:

$$S_{N,D} = \sum_{l=D}^{N} z_{l,D} = e^{i2\pi fTD} \sum_{l=D}^{N} |x_l|^2 + \sum_{l=D}^{N} w_{l,D} \quad (4)$$

The mean of $w_{l,D}$ is zero, so the carrier frequency offset, $\hat{f}$, can be estimated as:

$$\hat{f}_D = \frac{Rad(S_{N,D})}{2\pi DT}. \quad (5)$$

Obtaining an accurate estimate for the carrier frequency offset requires the selection of an appropriate value of D. Larger auto-correlation lags can provide more accurate measurements (because the effect of individual symbol noise may be reduced), but can suffer from reduced estimation range due to phase wrapping effects (i.e. because the output of the Rad function in equation (5) is limited to $[-\pi, \pi]$). Conversely, short auto-correlations can estimate a large range of CFOs, but with limited accuracy. An improved approach may be desired.

SUMMARY OF THE INVENTION

According to a first aspect of the present invention there is provided a radio receiver device arranged:
  to receive a radio signal comprising a symbol sequence corresponding to a training sequence;
  to determine a first autocorrelation of said symbol sequence using a first autocorrelation latency;
  to determine a second autocorrelation of said symbol sequence using a second autocorrelation latency that is longer than the first autocorrelation latency; and
  to combine said first and second autocorrelations to determine an estimate of carrier frequency offset between the radio signal and the radio receiver device.

Thus, it will be recognised by those skilled in the art that radio receiver devices according to embodiments of the present invention are able to estimate a wide range of carrier frequency offsets (CFO) accurately by combining the results of autocorrelations with different latencies. For instance, the first autocorrelation may be able to provide information on a large range of possible CFOs whilst the second autocorrelation can provide refining information that allows an accurate estimate of CFO to be produced. This may allow more reliable CFO estimation than previous approaches as it mitigates the trade-off between range and accuracy.

As explained above, combining information from two autocorrelations with different latencies can provide accurate CFO estimation over a wide range of possible CFOs. In some situations two autocorrelations may be sufficient to produce a CFO estimate of the desired accuracy and estimation range. However, in a set of embodiments the radio receiver device is further arranged to determine a third autocorrelation of said symbol sequence using a third autocorrelation latency that is longer than the second autocorrelation latency. In such embodiments the radio receiver device may be arranged to combine said first, second and third autocorrelations to determine the estimate of carrier frequency offset between the radio signal and the radio receiver device.

Moreover, in some embodiments, the radio receiver device may be arranged to perform further autocorrelations with progressively longer latencies (e.g. four, five or six or more) and to use these to further improve the accuracy and/or range of the CFO estimate.

At least part of the first and second autocorrelations may be determined at the same time, i.e. in parallel. For instance, the radio receiver device may be arranged to store the symbol sequence to a buffer (e.g. a shift register) and to access symbols stored in said buffer to determine different autocorrelations in parallel. The radio receiver device may utilize a multi-delay-branch algorithm, e.g. wherein a first branch determines the first autocorrelation at the same time as a second branch determines the second autocorrelation. In embodiments utilizing additional autocorrelations, these may also or alternatively be performed in parallel in a corresponding manner (e.g. with additional branches).

In a set of embodiments, the training sequence contains a repeating pattern of symbols. For instance, the training sequence may comprise a Short Training Sequence (STS) that is repeated one or more times. The training sequence may consist of a repeating pattern of symbols. The presence of symbols corresponding to a repeating pattern in the incoming symbol sequence may simplify one or more of the processing steps involved in estimating the CFO.

In a set of embodiments, the training sequence comprises a non-repeating sequence of symbols (i.e. one or more sections of symbols that are not repeated). For example, the training sequence may simply consist of a sequence of symbols that is known to the radio receiver device in advance. Of course, some sections of a standard non-repeating training sequence may coincidentally repeat.

It will be recognised that an autocorrelation of a discrete-time series (such as the symbol sequence) includes a number of results equal to the difference between the number of entries in the time series (i.e. the number of symbols in the training set) and the latency of the autocorrelation.

In a set of embodiments (e.g. where the training sequence comprises a repeating symbol sequence), combining the autocorrelations to determine an estimate of carrier frequency offset may comprise calculating a sum or an average (e.g. a mean) of results of one or more of said autocorrelations (e.g. as indicated in equation (4)).

In some embodiments (e.g. where the training sequence comprises a non-repeating symbol sequence), combining the autocorrelations to determine an estimate of carrier frequency offset may comprise performing an element-wise division of results of one or more of said autocorrelations with corresponding autocorrelation results determined from the training sequence (i.e. determined using the same autocorrelation latency). In other words, the radio receiver device may, for one or more autocorrelations, be arranged to divide each autocorrelation result by a corresponding autocorrelation result for the training sequence (i.e. from an autocorrelation of the training sequence with the same latency). This may not be necessary when the training sequence consists of a repeating pattern of symbols.

In a set of embodiments, combining the autocorrelations to determine an estimate of the carrier frequency offset comprises calculating a sum or an average (e.g. a mean) of results of said element-wise division (e.g. as indicated in equation (3)).

The radio receiver device may be arranged to calculate an angular argument (i.e. a Rad function) of said sum or average of autocorrelation results and/or said sum or average of element-wise division results. This angular argument may indicate a phase offset over the autocorrelation latency between the radio receiver and the incoming radio signal. A phase offset $\phi$ determined from an autocorrelation may be used to calculate an initial estimate of CFO, i.e. according to $$\hat{f} = \frac{\Phi}{2\pi DT},$$

where T is the symbol duration and D is the autocorrelation latency.

In some embodiments, combining the autocorrelations to determine an estimate of carrier frequency offset may comprise calculating a first initial estimate of CFO using the first autocorrelation, calculating a second initial estimate of CFO using the second autocorrelation, and combining said first and second initial estimates to produce the final CFO estimate.

However, in some embodiments, combining the autocorrelations to determine an estimate of the carrier frequency offset may comprise determining and combining one or more intermediate results, such as intermediate phase offsets (e.g. first and second phase offsets determined from a sum or an average of results (of one or more of said autocorrelations or element-wise divisions), as explained above).

The radio receiver device may be arranged to combine initial CFO estimates and/or intermediate phase offsets using one or more wrapping functions, e.g. defined as wrap($\alpha$) =mod($\alpha$+$\pi$, 2$\pi$)−$\pi$.

In a set of embodiments, the radio receiver device is arranged to combine autocorrelations such that one or more errors associated with said autocorrelations are cancelled out, to enable a more accurate final CFO estimate. For instance, the radio receiver device may be arranged to combine initial CFO estimates or intermediate phase offsets (e.g. by adding and/or subtracting) such that one or more errors associated with said one or more initial CFO estimates or intermediate phase offsets are cancelled. Combining the autocorrelations to determine an estimate of the carrier frequency offset may comprise simple arithmetic manipulation of initial CFO estimates or intermediate phase offsets (e.g. adding or subtracting values or multiples of said values).

The latency of the longest autocorrelation (e.g. the second autocorrelation) may at least partially determine how accurate the estimate of CFO is. Whilst it might be expected that using a higher latency always leads to greater CFO accuracy, the applicant has determined that in at least some applications a latency of approximately two-thirds of the length of the training sequence actually provides close to optimal CFO estimation. Therefore, in a set of embodiments, a longest of the autocorrelation latencies (e.g. the second autocorrelation latency when only first and second autocorrelations are used) is approximately two-thirds of a length of the training sequence. For instance, the longest latency may be between 50% and 80% of a length of the training sequence, between 60% and 75% of a length of the training sequence, or between 63% and 69% of a length of the training sequence. In a set of embodiments the longest latency is equal to an integer number of symbols that is close or closest to two-thirds of a number of symbols in the training sequence.

Conversely, the latency of the shortest autocorrelation (i.e. the first latency) may determine the range of possible CFOs that can be estimated. In a set of embodiments, the first latency is selected to provide a CFO estimation range that contains a maximum expected CFO. The maximum expected CFO may be determined based on known manufacturing tolerances of the radio receiver device (e.g. a known variability in the frequency of a local oscillator of the radio receiver device), expected uncertainties in the carrier frequency of the radio signal (e.g. based on an acceptable uncertainty of carrier frequencies set out in a communication standard) and/or expected operational conditions (e.g. interference and/or Doppler effects). For instance, the maximum expected CFO may be the CFO expected to arise under reasonable worst-case communication conditions (e.g. high channel noise, large Doppler effects and large local oscillator variations due to manufacturing variations or operating conditions). For instance, a radio receiver device intended for communicating over short ranges with a static transmitter in stable temperature conditions may have a low expected maximum CFO, whilst a radio receiver device intended for long-distance communication in noisy and variable conditions may need to be able to estimate larger CFOs.

In a set of embodiments, where the training sequence comprises a repeating pattern of symbols, the first latency is a length of a low number of repeating patterns (e.g. five repetitions or less, three repetitions or less or even only one repetition).

It will be appreciated that the approach to CFO estimation disclosed herein may be advantageously applied for a wide variety of radio signals and receiver device hardware. However, in a set of embodiments, the radio signal has a carrier frequency of 1 MHz or more, 100 MHz or more, or even 1 GHz or more (e.g. 2.4 GHz). In some embodiments the radio signal is a Bluetooth radio signal, e.g. a Bluetooth Low Energy signal, or an IEEE 802.11 radio signal such as an IEEE 802.11ax radio signal.

The radio receiver device may comprise a frontend portion (e.g. an analogue frontend portion) arranged to determine the symbol sequence, e.g. by receiving and sampling the incoming radio signal. The frontend portion may comprise one or more ADCs, mixers, filters, amplifiers and/or baluns. The radio receiver device may comprise a processor (e.g. a baseband processor) arranged to determine the first and/or second autocorrelation and/or to combine the first and second autocorrelations to determine the estimate CFO. This or another processor of the radio receiver device may perform other steps of embodiments disclosed herein.

The radio receiver device may comprise a radio transceiver device (i.e. able to transmit and receive radio signals).

The radio receiver device may comprise a local oscillator (e.g. for demodulation and/or decoding of an incoming signal). The carrier frequency offset may be an offset between a carrier frequency of the incoming signal and a local oscillating signal derived from the local oscillator.

According to a second aspect of the present invention there is provided a method of estimating a carrier frequency offset between a radio receiver device and an incoming radio signal, the radio signal comprising a symbol sequence corresponding to a training sequence, the method comprising:
  determining a first autocorrelation of said symbol sequence using a first autocorrelation latency;
  determining a second autocorrelation of said symbol sequence using a second autocorrelation latency that is longer than the first autocorrelation latency; and
  combining said first and second autocorrelations to determine an estimate of carrier frequency offset between the radio signal and the radio receiver device.

The invention extends to computer software that, when executed by a radio receiver device, causes said radio receiver device to perform the method disclosed herein. The radio receiver device may comprise a memory storing said software. The radio receiver device may comprise a processor arranged to execute said software.

Features of any aspect or embodiment described herein may, wherever appropriate, be applied to any other aspect or embodiment described herein. Where reference is made to different embodiments, it should be understood that these are not necessarily distinct but may overlap. It will be appreciated that all of the preferred features of the radio receiver device according to the first aspect described above may also apply to the other aspects of the invention.

BRIEF DESCRIPTION OF THE DRAWINGS

One or more non-limiting examples will now be described, by way of example only, and with reference to the accompanying figures in which.

DETAILED DESCRIPTION

Figure 1:
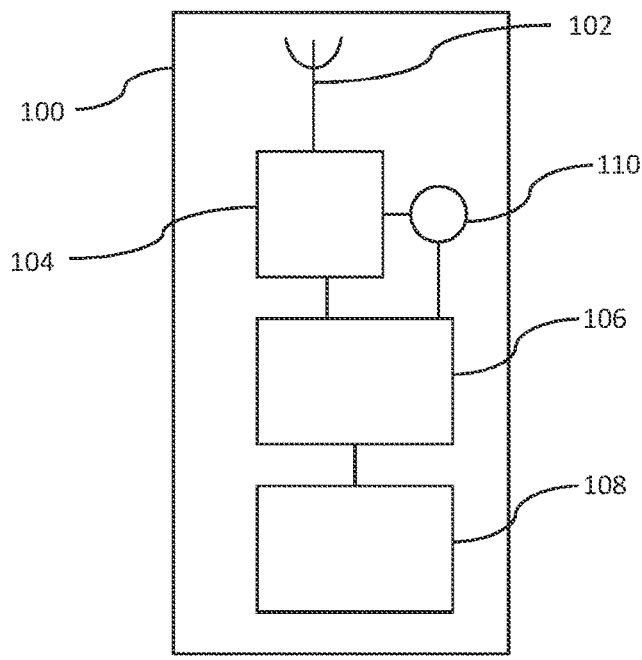
FIG. 1 is a schematic diagram of a radio receiver device according embodiments of the present invention.

FIG. 1 shows a radio receiver device 100 comprising an antenna 102, an RF front-end portion 104, a processor 106 and a memory 108.

The RF frontend portion 104 handles analogue reception processes such as demodulation, demultiplexing and sampling and may comprise one or more ADCs, mixers, filters, amplifiers and/or baluns. The processor 106 executes software stored on the program memory 108 to process and act on the output from the front-end portion 104.

In use, the radio receiver device 100 receives a radio signal comprising a packet of communication data. The packet has a preamble, used for synchronising the radio receiver device 100 with the incoming packet, and a payload, which is the actual data to be received. The preamble comprises a known training sequence (TS) of symbols.

To successfully decode the payload, the radio receiver device 100 uses the preamble to synchronise accurately with the timing and frequency of the incoming signal. As part of this, the radio receiver device 100 determines a carrier frequency offset (CFO) between the carrier frequency used by the incoming signal and a signal produced by a local oscillator 110. Whilst the local oscillator 110 is typically configured to generate a frequency matching the incoming radio signal, differences may still arise due to temperature and/or process variations in the local oscillator 110 as well as channel effects (e.g. Doppler effects).

The RF frontend portion 104 processes an incoming radio signal to produce a symbol sequence corresponding to the preamble of the data packet. The processor 106 performs CFO estimation using the preamble symbol sequence as explained below with additional reference to FIGS. 2 and 3.

Figure 2:
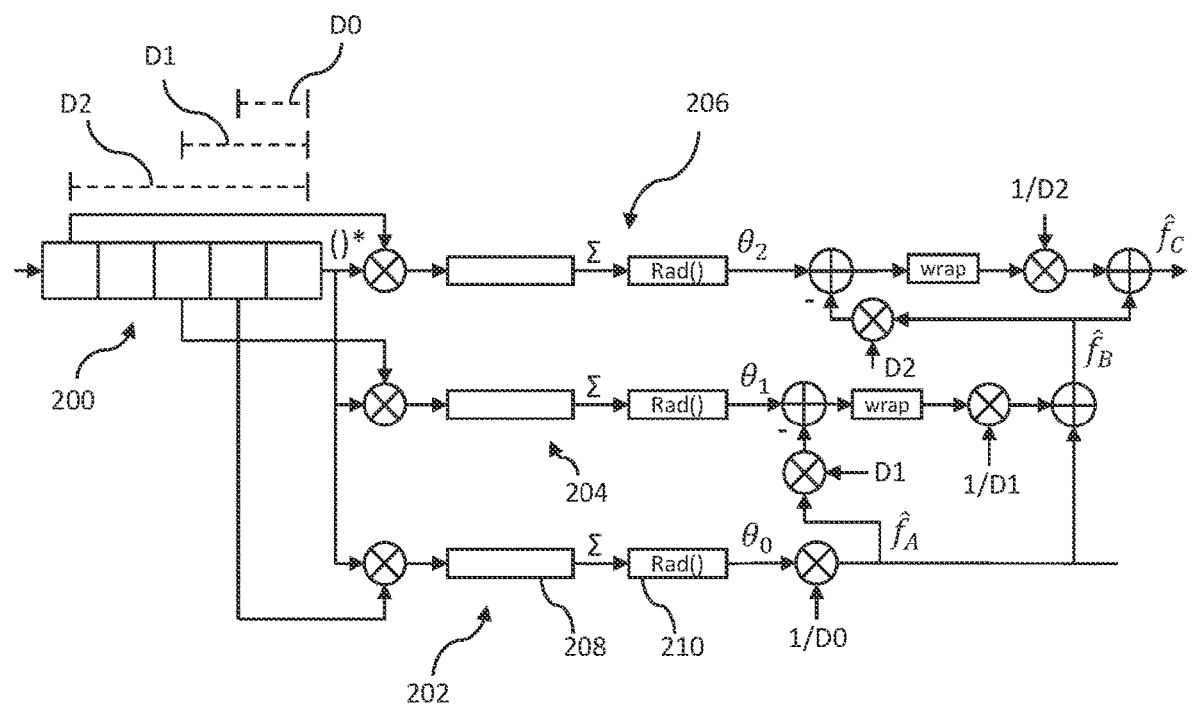
FIG. 2 is a flow diagram illustrating operation of the radio receiver device of FIG. 1 according to a first embodiment.

In a first embodiment illustrated by FIG. 2, the training sequence (TS) of the preamble consists of a short training sequence (STS) that is repeated several times. Because the preamble symbol sequence contains a repeating STS, an estimate for the CFO can be determined using an autocorrelation as explained above, with the autocorrelation latency D selected to be a multiple of a length of the STS.

However, as explained above, it is difficult to select a value for D which provides sufficiently accurate CFO estimation over a sufficiently wide estimation range. Therefore, the processor 106 implements a multi-delay-branch algorithm as shown in FIG. 2 to determine an accurate estimate of CFO over a wide range.

The preamble symbol sequence with length N is stored in a buffer register 200 and analysed using three parallel branches. A first branch 202 performs a first autocorrelation with a first latency $D_0$, a second branch 204 performs a second autocorrelation with a second latency $D_1$ and a third branch 206 performs a third autocorrelation with a third latency $D_2$. The three branches are then combined to determine a final CFO estimate.

In this example, $D_0$ is one symbol long (T), $D_1$ is two symbols long (2T) and $D_2$ is four symbols long (4T).

The first branch 202 calculates $z_{l,D_0}$ for $D\leq l\leq N$ according to equation (2) above, with the values of $z_{l,D_0}$ stored in a first register 208. The sum $S_{N,D_0}$ of the first register 208 is calculated and an a Rad( ) function 210 is used to calculate a first angle $\theta_0=\phi+n_0$, where $\phi$ is the angular phase offset between the incoming signal and the local oscillator 110 over one symbol $$\left(\text{i.e. the CFO } \hat{f} = \frac{\phi}{2\pi T}\right)$$

and $n_0$ represents noise on the measurement.

Corresponding processes are performed in the second and third branches 204, 206 to determine second and third angles $\theta_1=2\phi+n_1$ and $\theta_2=4\phi+n_2$. Because the first, second and third angles are constrained to be between $\pm\pi$, the first branch provides an estimation range for $\phi$ of $\pm\pi$, the second branch 204 provides an estimation range for $\phi$ of $\pm\pi/2$ and the third branch 206 provides an estimation range for $\phi$ of $\pm\pi/4$.

The first, second and third angles $\theta_0$, $\theta_1$, $\theta_2$ are combined as illustrated in FIG. 2 to produce an estimate of the CFO $\hat{f}$. For convenience, T is set to equal $1/2\pi$ (i.e. $2\pi T=1$).

First, the first and second angles $\theta_0$, $\theta_1$ are combined by defining a first CFO estimate as $\hat{f}_A$ as:

$$\hat{f}_A = \frac{\theta_0}{D_0}, \quad (6)$$

and a second CFO estimate $\hat{f}_B$ as:

$$\hat{f}_B = \left(\frac{\text{wrap}(\theta_1 - D_1\hat{f}_A)}{D_1} + \hat{f}_A\right), \quad (7)$$

where:

$$\text{wrap}(\alpha) = \text{mod}(\alpha + \pi, 2\pi) - \pi. \quad (8)$$

$\hat{f}_B$ can thus be written as:

$$\hat{f}_B = \frac{\text{wrap}(\theta_1 - 2\theta_0)}{2} + \theta_0 = \frac{1}{2}\text{wrap}(n_1 - 2n_0) + \phi + n_0, \quad (9)$$

Assuming the SNR of the incoming signal is reasonable, $n_1 = 2_{n_0}$ is within $[-\pi, \pi]$ and we have:

$$\hat{f}_B = \frac{1}{2}(n_1 - 2n_0) + \phi + n_0 = \phi + \frac{1}{2}n_1. \quad (10)$$

The output of the third branch 206 may then be combined by defining $\hat{f}_C$ as:

$$\hat{f}_C = \frac{\text{wrap}(\theta_2 - D_2\hat{f}_B)}{D_2} + \hat{f}_B. \quad (11)$$

This leads to:

$$\hat{f}_C = \frac{\text{wrap}(4\phi + n_2 - 4\phi - 2n_1)}{4} + \phi + \frac{1}{2}n_1 = \quad (12)$$

$$\frac{\text{wrap}(n_2 - 2n_1)}{4} + \phi + \frac{1}{2}n_1 = \frac{1}{4}n_2 - \frac{1}{2}n_1 + \phi + \frac{1}{2}n_1 = \phi + \frac{1}{4}n_2.$$

The possible range of $\hat{f}_C$ is thus maintained between $\pm\pi$ with an error of only $\frac{1}{4}n_2$. In other words, $\hat{f}_C$ is an accurate but wide-ranging estimate of CFO.

The example described here and shown in FIG. 2 has only three branches 202, 204, 206, but it will be recognized that the same principle can be applied to embodiments using only two branches or with more than three branches if necessary simply by using appropriate values of D for each branch.

In a second embodiment, the training sequence (TS) of the preamble is simply a known sequence (i.e. it does not include a repeating STS). In this embodiment, the processor 106 implements the multi-delay-branch algorithm illustrated in FIG. 3 to determine an accurate estimate of CFO over a wide range.

The preamble symbol sequence with length N is stored in a buffer register 300 and analysed using three parallel branches. A first branch 302 performs a first autocorrelation with a first latency $D_0$, a second branch 304 performs a second autocorrelation with a second latency $D_1$ and a third branch 306 performs a third autocorrelation with a third latency $D_2$. The three branches are then combined to determine a final CFO estimate.

In this example, $D_0$ is one symbol long (T), $D_1$ is two symbols long (2T) and $D_2$ is four symbols long (4T).

The first branch 302 calculates $z_{l,D_0}$ for $D\leq l\leq N$ according to equation (2) above, with the values of $z_{l,D_0}$ stored in a first register 308. Each element stored in the register is then divided by corresponding elements of an autocorrelation of the known training sequence TS with the first latency $D_0$, in step 309.

The sum $S_{N,D_0}$ of the result is calculated and a Rad( )function 310 is used to calculate a first CFO estimate $\hat{f}_0$. Corresponding processes are performed in the second and third branches 304, 306 to determine second and third CFO estimates $\hat{f}_1$, $\hat{f}_2$. The first branch provides an estimation range for $\hat{f}_0$ of $\pm 1/2T$, the second branch 304 provides an estimation range for $\hat{f}_1$ of $\pm 1/4T$, and the third branch 306 provides an estimation range for $\hat{f}_2$ of $\pm 1/8T$.

Figure 3:
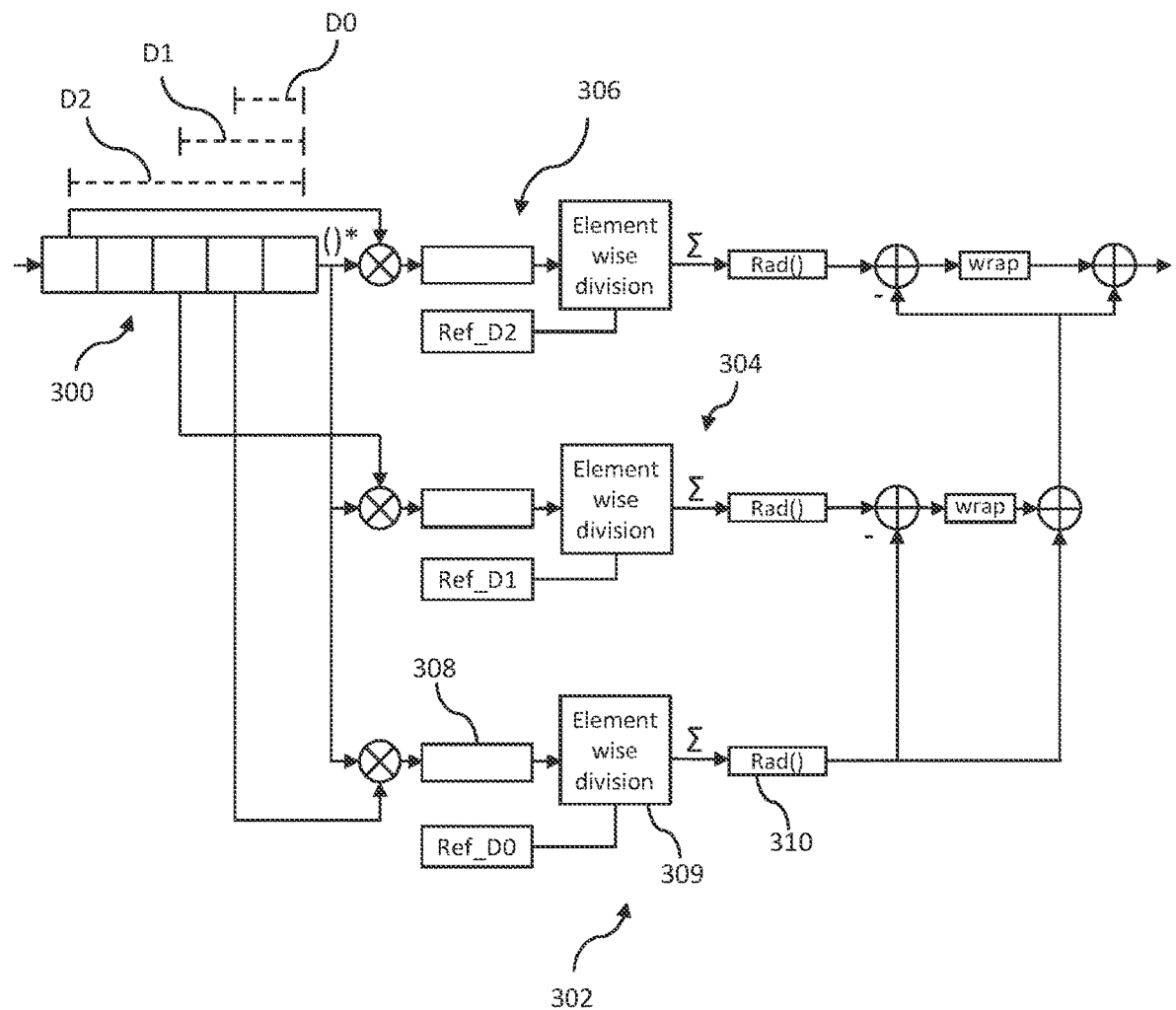
FIG. 3 is a flow diagram illustrating operation of the radio receiver device of FIG. 1 according to a second embodiment.

The first, second and third angles $\hat{f}_0$, $\hat{f}_1$, $\hat{f}_2$ are combined by addition and wrapping as illustrated in FIG. 3 to produce an estimate of the CFO $\hat{f}$.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A radio receiver device arranged:
to receive a radio signal comprising a symbol sequence corresponding to a training sequence;
to determine a first autocorrelation of said symbol sequence using a first autocorrelation latency;
to determine a second autocorrelation of said symbol sequence using a second autocorrelation latency that is longer than the first autocorrelation latency; and
to combine said first and second autocorrelations to determine an estimate of carrier frequency offset between the radio signal and the radio receiver device;
wherein a longest autocorrelation of the symbol sequence that is determined by the radio receiver device uses a longest autocorrelation latency that is between 50% and 80% of a length of the training sequence.

2. The radio receiver device of claim 1, wherein the longest autocorrelation latency that is between 60% and 75% and of a length of the training sequence.

3. The radio receiver device of claim 2, wherein the longest autocorrelation latency is equal to an integer number of symbols closest to two-thirds of a number of symbols in the training sequence.

4. The radio receiver device of claim 1, configured to determine at least part of the first and second autocorrelations at the same time.

5. The radio receiver device of claim 1, configured to determine a third autocorrelation of said symbol sequence using a third autocorrelation latency that is longer than the second autocorrelation latency, and to combine said first, second and third autocorrelations to determine the estimate of carrier frequency offset between the radio signal and the radio receiver device.

6. The radio receiver device of claim 1, wherein the training sequence contains a repeating pattern of symbols.

7. The radio receiver device of claim 6, wherein the first latency is a length of five repetitions or less of the repeating pattern.

8. The radio receiver device of claim 1, wherein the training sequence comprises a non-repeating sequence of symbols.

9. The radio receiver device of claim 1, wherein combining the autocorrelations to determine an estimate of carrier frequency offset comprises calculating a sum or an average of results of one or more of said autocorrelations.

10. The radio receiver device of claim 9, arranged to calculate an angular argument of said sum or average of results of one or more of said autocorrelations.

11. The radio receiver device of claim 1, wherein combining the autocorrelations to determine an estimate of carrier frequency offset comprises performing an element-wise division of results of one or more of said autocorrelations with corresponding autocorrelation results determined from the training sequence.

12. The radio receiver device of claim 10, wherein determining an estimate of the carrier frequency offset comprises calculating a sum or an average of results of said element-wise division.

13. The radio receiver device of claim 1, wherein combining autocorrelations to determine an estimate of carrier frequency offset (CFO) comprises calculating a first initial estimate of CFO using the first autocorrelation, calculating a second initial estimate of CFO using the second autocorrelation, and combining said first and second initial estimates to produce the final CFO estimate.

14. The radio receiver device of claim 13, arranged to combine said initial CFO estimates using one or more wrapping functions.

15. The radio receiver device of claim 1, wherein combining autocorrelations to determine an estimate of the carrier frequency offset comprises determining and combining one or more intermediate phase offsets.

16. The radio receiver device of claim 15, arranged to combining said intermediate phase offsets using one or more wrapping functions.

17. The radio receiver device of claim 1, arranged to combine autocorrelations such that one or more errors associated with said autocorrelations are cancelled out.

18. The radio receiver device of claim 1, wherein the first latency is selected to provide a carrier frequency offset (CFO) estimation range that contains a maximum expected CFO.

19. A method of estimating a carrier frequency offset between a radio receiver device and an incoming radio signal, the radio signal comprising a symbol sequence corresponding to a training sequence, the method comprising:
determining a first autocorrelation of said symbol sequence using a first autocorrelation latency;
determining a second autocorrelation of said symbol sequence using a second autocorrelation latency that is longer than the first autocorrelation latency; and
combining said first and second autocorrelations to determine an estimate of carrier frequency offset between the radio signal and the radio receiver device;
wherein a longest autocorrelation of the symbol sequence that is determined in the method uses a longest autocorrelation latency that is between 60% and 75% of a length of the training sequence.

20. A non-transitory computer-readable recording medium storing instructions, that, when executed by a radio receiver device, causes said radio receiver device to perform the method of claim 19.

* * * * *